(12) United States Patent
Feng et al.

(10) Patent No.: US 11,640,828 B2
(45) Date of Patent: May 2, 2023

(54) DECT BASE STATION, MOBILE TERMINAL AND SYSTEM FOR TRANSMITTING DATA FRAME

(71) Applicant: YEALINK (XIAMEN) NETWORK TECHNOLOGY CO., LTD., Fujian (CN)

(72) Inventors: Wanjian Feng, Fujian (CN); Zhipeng Lin, Fujian (CN)

(73) Assignee: YEALINK (XIAMEN) NETWORK TECHNOLOGY CO., LTD., Xiamen (CN)

(*) Notice: Subject to any disclaimer, the term of this patent is extended or adjusted under 35 U.S.C. 154(b) by 59 days.

(21) Appl. No.: 17/319,050

(22) Filed: May 12, 2021

(65) Prior Publication Data

US 2021/0358510 A1 Nov. 18, 2021

(30) Foreign Application Priority Data

May 12, 2020 (CN) .......................... 202010399748.9

(51) Int. Cl.
*G10L 19/24* (2013.01)
*H04L 1/00* (2006.01)

(52) U.S. Cl.
CPC ............ *G10L 19/24* (2013.01); *H04L 1/0007* (2013.01)

(58) Field of Classification Search
CPC ....... G10L 19/24; G10L 19/00; G10L 19/022; G10L 19/04; G10L 19/06; G10L 19/16; G10L 19/167; G10L 19/173; G10L 19/18; G10L 19/22

USPC .......................... 704/200, 201, 206, 211, 229
See application file for complete search history.

(56) References Cited

U.S. PATENT DOCUMENTS

| | | | | |
|---|---|---|---|---|
| 6,173,347 B1* | 1/2001 | Emmerich | ............ | G06F 13/423 713/600 |
| 6,553,424 B1* | 4/2003 | Kranz | ....................... | G06F 5/06 370/330 |
| 2003/0223412 A1* | 12/2003 | Chen | .................... | H04M 1/7243 370/375 |
| 2008/0027711 A1* | 1/2008 | Rajendran | ............. | G10L 19/167 704/201 |
| 2010/0138724 A1* | 6/2010 | Fogel | .................... | H04L 1/0084 714/776 |

* cited by examiner

*Primary Examiner* — Qi Han (57) ABSTRACT

The present application discloses a DECT base station, mobile terminal and system for transmitting data frame. The DECT base station comprises the first codec module and the first RF module. The first codec module is configured to store the acquired encoded data frame in the encoding buffer area of the first codec module; wherein, between the length of the encoded data frame and the length of a B-field data in the TDMA frame, there is a multiple relationship. The first RF module is configured to send, when receiving the first trigger signal, the encoded data frame in the encoding buffer area to mobile terminal. The present application can transmit data frame under the action of the trigger signal, to ensure the completeness and effectiveness of the data frame, thereby increasing the number of broadband voice communication channels.

13 Claims, 5 Drawing Sheets

DECT BASE STATION, MOBILE TERMINAL AND SYSTEM FOR TRANSMITTING DATA FRAME

CROSS-REFERENCE TO RELATED APPLICATIONS

The present application claims the benefit of Chinese Patent Application No. 202010399748.9 filed on May 12, 2020, the contents of which are hereby incorporated by reference.

FIELD OF THE INVENTION

The present disclosure relates to the technical filed of mobile communication, and is more particularly concerned with a DECT base station, mobile terminal and system for transmitting data frame.

BACKGROUND OF THE INVENTION

Currently, when an audio codec with a code rate of 64 kbps is used in DECT (Digital Enhanced Cordless Telecommunications) base station and mobile terminal, only 6-channels of broadband voice communication can be realized at most. In order to increase the number of broadband voice communication channels, the compression rate of the audio codec for its processing data needs to be improved. For example, replacing the audio codec for processing data stream with the audio codec for processing data frame. However, in the prior art, DECT base station and mobile terminal usually collect data stream every 125 us. Since the data frame requires completeness and orderliness, if the data frame is still collected every 125 us, the data frame may be missing and misplaced, etc., which makes it difficult to ensure the completeness and orderliness of the data frame, resulting in the audio codec unable to process the normal data.

SUMMARY OF THE INVENTION

To overcome the defects of the prior art, the present disclosure provides a DECT base station, mobile terminal and system for transmitting data frame, which can transmit data frame under the action of trigger signal to ensure the completeness and orderliness of data frame, so as to increase the number of broadband voice communication channels.

To solve the above technical problems, in the first aspect, an embodiment of the present disclosure provides a DECT base station for transmitting data frame which comprises the first codec module and the first RF (Radio Frequency) module;

the first codec module is configured to store the acquired encoded data frame in the encoding buffer area of the first codec module; wherein, between the length of the encoded data frame and the length of a B-field data in the TDMA (Time Division Multiple Access) frame, there is a multiple relationship; and the first RF module is configured to send the encoded data frame in the encoding buffer area to mobile terminal when receiving the first trigger signal.

Further, the first RF module is further configured to send, when receiving the second trigger signal, the data frame to be decoded from the mobile terminal to the first codec module; wherein, between the length of the data frame to be decoded and the length of a B-field data in the TDMA frame, there is a multiple relationship; and the first codec module is further configured to store the data frame to be decoded in the decoding buffer area of the first codec module to decode the data frame to be decoded.

Further, the output code rate of the first codec module is less than or equal to 32 kbps, and the sampling frequency of the first codec module is greater than or equal to 16 KHz.

Further, the length of the encoded data frame that can be stored in the encoding buffer area is set according to the length of the TDMA frame; wherein, the length of the encoded data frame that can be stored in the encoding buffer area is n×10 ms, and n>0.

Further, the length of the data frame to be decoded that can be stored in the decoding buffer area is set according to the length of the TDMA frame; wherein, the length of the data frame to be decoded that can be stored in the decoding buffer area is n×10 ms, n>0.

Further, the first trigger signal is one of any time slot in the TDMA frame, internal clock signal, and external clock signal.

Further, the second trigger signal is one of any time slot in the TDMA frame, internal clock signal, and external clock signal.

In the second aspect, an embodiment of the present disclosure provides a mobile terminal for transmitting data frame which comprises a second codec module and a second RF module;

the second codec module is configured to store the acquired encoded data frame in the encoding buffer area of the second codec module; wherein, between the length of the encoded data frame and the length of a B-field data in the TDMA frame, there is a multiple relationship; and the second RF module is configured to send, when receiving the third trigger signal, the encoded data frame in the encoding buffer area to the DECT base station.

Further, the second RF module is further configured to send, when receiving the fourth trigger signal, the data frame to be decoded from the DECT base station to the second codec module; wherein, between the length of the data frame to be decoded and the length of a B-field data in the TDMA frame, there is a multiple relationship; and the second codec module is further configured to store the data frame to be decoded in the decoding buffer area of the second codec module to decode the data frame to be decoded.

Further, the output code rate of the second codec module is less than or equal to 32 kbps, and the sampling frequency of the second codec module is greater than or equal to 16 KHz.

Further, the length of the encoded data frame that can be stored in the encoding buffer area is set according to the length of the TDMA frame; wherein, the length of the encoded data frame that can be stored in the encoding buffer area is n×10 ms, and n>0.

Further, the length of the data frame to be decoded that can be stored in the decoding buffer area is set according to the length of the TDMA frame; wherein, the length of the data frame to be decoded that can be stored in the decoding buffer area is n×10 ms, n>0.

Further, the third trigger signal is one of any time slot in the TDMA frame, internal clock signal, and external clock signal.

Further, the fourth trigger signal is one of any time slot in the TDMA frame, internal clock signal, and external clock signal.

In the third aspect, an embodiment of the present disclosure provides a system for transmitting data frame which comprises at least one DECT base station described above and multiple mobile terminals described above.

The embodiments of the disclosure have the following beneficial effects.

The DECT base station is installed with the first codec module and the first RF module, the first codec module stores the acquired encoded data frame in the encoding buffer area of the first codec module, and when receiving the first trigger signal, the first RF module fills the encoded data frame in the encoding buffer area into the B-field of the corresponding slot in the TDMA frame and sends it to the mobile terminal, thereby completing the sending of a complete and ordered data frame to the mobile terminal. Compared to the prior art, in the present disclosure, by setting the first trigger signal synchronized with the TDMA frame acquired by the first RF module, the first RF module, under the action of the first trigger signal, can send the encoded data frame acquired by the first codec module in the encoding buffer area to the mobile terminal, so it is guaranteed that the frame of the encoded data frame sent by the first RF module to the mobile terminal is consistent with the frame of the encoded data frame acquired by the first codec module. In the embodiments of the present disclosure, the data frame can be transmitted under the action of the trigger signal to ensure the completeness and effectiveness of the data frame.

DETAILED DESCRIPTION OF THE INVENTION

In the following, the technical solutions in the embodiments of the present disclosure will be clearly and completely described with reference to the drawings in the embodiments of the present disclosure. Apparently, the described embodiments are merely a part of the embodiments of the present disclosure, but not all embodiments. Based on the embodiments of the present disclosure, all other embodiments obtained by a person of ordinary skill in the art without creative efforts shall fall within the protection scope of the present disclosure.

Figure 1:
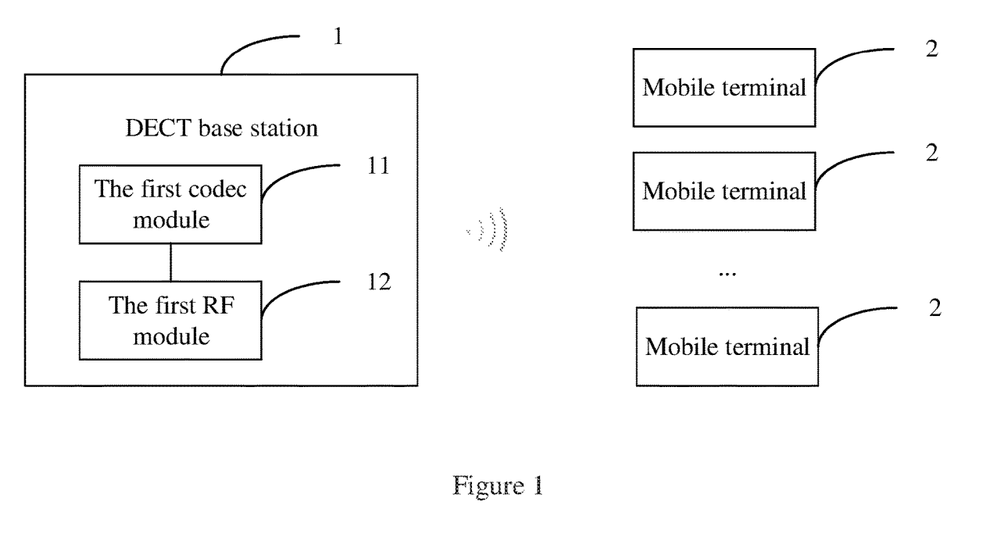
FIG. 1 is a structure diagram of a DECT base station for transmitting data frame in the first embodiment of the present disclosure.
Figure 2:
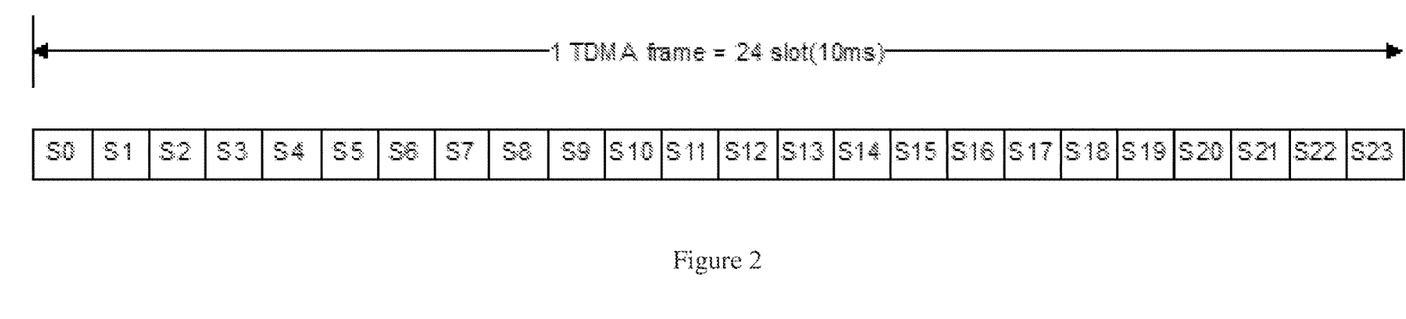
FIG. 2 is a data structure diagram of a time slot in the TDMA frame in the first embodiment of the present disclosure.
Figure 3:
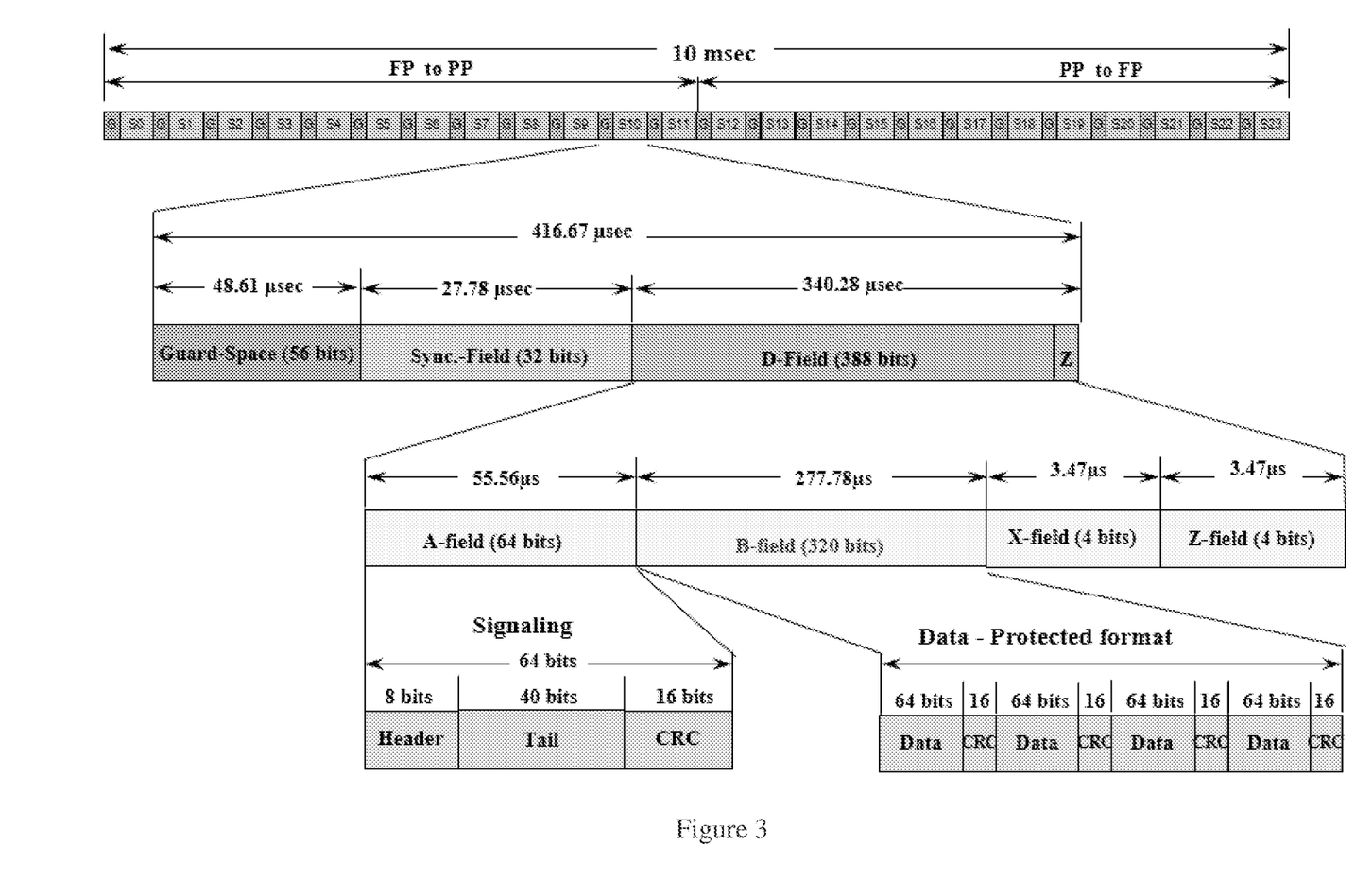
FIG. 3 is a data structure diagram of a B-field data in the TDMA frame in the first embodiment of the present disclosure.

Please refer to FIGS. 1-3.

As shown in FIG. 1, the first embodiment provides a DECT base station 1 for transmitting data frame, which comprises the first codec module 11 and the first RF (Radio Frequency) module 12. The first codec module 11 is configured to store the acquired encoded data frame in the encoding buffer area of the first codec module 11. Wherein, between the length of the encoded data frame and the length of a B-field data in the TDMA frame, there is a multiple relationship. The first RF module 12 is configured to send the encoded data frame in the encoding buffer area to mobile terminal 2 when receiving the first trigger signal.

It should be noted that the first trigger signal is a signal synchronized with the TDMA frame acquired by the first RF module 12. Between the mobile terminal 2 and the DECT base station 1, there is a communication connection. The mobile terminal 2 comprises mobile devices such as handle or headset, etc.

For example, according to the DECT Gap protocol, after encoding audio data, the first codec module 11 stores the acquired encoded data frame in the encoding buffer area of the first codec module 11, so that the first RF module 12 can directly extract the encoded data frame acquired by the first codec module 11 from the encoding buffer area when receiving the first trigger signal, and then fill the encoded data frame into the B-field of the corresponding slot in the TDMA frame and send it to the mobile terminal 2. Wherein, in order to avoid data competition for the storage space in the encoding buffer area, double buffering is adopted. For example, when the length of the encoded data frame is exactly equal to the length of a B-field data, the total length of the encoded data frame that can be stored in the encoding buffer area is set to 20 ms. And when the length of the encoded data frame is equal to 0.5 times of the length of a B-field data, the total length of the encoded data frame that can be stored in the encoding buffer area is set to 10 ms.

When receiving the first trigger signal, the first RF module 12 extracts the encoded data frame acquired by the first codec module 11 from the encoding buffer area, and fills the extracted encoded data frame into the B-field of the corresponding slot in the TDMA frame and sends it to the mobile terminal 2, thereby completing the sending of a complete and ordered data frame to the mobile terminal 2. Wherein, each B-field data is a voice data to be sent in a transmission slot in a TDMA frame. The TDMA frame is divided into 24 time slots which are 12 transmission time slots and 12 reception time slots. The data structure of TDMA frame and single time slot is shown in FIG. 2, and the data structure of a B-field data in TDMA frame is shown in FIG. 3.

In this embodiment, the DECT base station 1 is installed with the first codec module 11 and the first RF module 12, the first codec module 11 stores the acquired encoded data frame in the encoding buffer area of the first codec module 11, and when receiving the first trigger signal, the first RF module 12 fills the encoded data frame in the encoding buffer area into the B-field of the corresponding slot in the TDMA frame and sends it to the mobile terminal 2, thereby completing the sending of a complete and ordered data frame to the mobile terminal 2. In this embodiment, by setting the first trigger signal synchronized with the TDMA frame acquired by the first RF module 12, the first RF module 12, under the action of the first trigger signal, can send the encoded data frame acquired by the first codec module 11 in the encoding buffer area to the mobile terminal 2, so it may be guaranteed that the B-field data of the corresponding time slot in the TDMA frame sent by the first RF module 12 to the mobile terminal 2 is consistent with the encoded data frame acquired by the first codec module 11. In this embodiment, the data frame can be transmitted under the action of the trigger signal to ensure the completeness and effectiveness of the data frame, thereby increasing the number of broadband voice communication channels.

In a preferred embodiment, the first RF module 12 is further configured to send, when receiving the second trigger signal, the data frame to be decoded from the mobile terminal 2 to the first codec module 11. Wherein, between the length of the data frame to be decoded and the length of a B-field data in the TDMA frame, there is a multiple relationship. The first codec module 11 is further configured to store the data frame to be decoded in the decoding buffer area of the first codec module 11 to decode the data frame to be decoded.

It should be noted that the second trigger signal is a signal synchronized with the TDMA frame acquired by the first RF module 12.

For example, according to the DECT Gap protocol, when receiving the second trigger signal, the first RF module 12 extracts the data fame to be decoded from the TDMA frame sent by the mobile terminal 2, sends the extracted data frame to be decoded to the first codec module 11, so that the first codec module 11 can store the data frame to be decoded in the decoding buffer area of the first codec module 11 to decode the data frame to be decoded. Wherein, the data fame to be decoded is the B-field data of the corresponding slot in the TDMA frame. And in order to avoid data competition for the storage space in the decoding buffer area, double buffering is adopted. For example, when the length of the data frame to be decoded is equal to the length of a B-field data, the total length of the data frame to be decoded that can be stored in the decoding buffer area is set to 20 ms. And when the length of the data frame to be decoded is equal to 0.5 times of the length of a B-field data, the total length of the data frame to be decoded that can be stored in the decoding buffer area is set to 10 ms.

After receiving the data frame to be decoded sent by the mobile terminal 2, the first codec module 11 stores the data frame to be decoded to the decoding buffer area of the first codec module 11 to decode the data frame to be decoded to acquire audio data, thereby completing the reception of a complete and ordered data frame sent by the mobile terminal 2. Wherein, each B-field data is a voice data to be received in a transmission slot in a TDMA frame. The TDMA frame is divided into 24 time slots which are 12 transmission time slots and 12 reception time slots.

In this embodiment, when receiving the second trigger signal, the first RF module 12 sends the data frame to be decoded from the mobile terminal 2 to the first codec module 11, and the first codec module 11 stores the data frame to be decoded in the decoding buffer area of the first codec module 11 to decode the data frame to be decoded, thereby completing the reception of a complete and ordered data frame sent by the mobile terminal 2. Wherein, the data frame to be decoded is the B-field data of the corresponding time slot in the TDMA frame. In this embodiment, by setting the second trigger signal synchronized with the TDMA frame acquired by the first RF module 12, the first RF module 12, under the action of the second trigger signal, can send the B-field data of the corresponding time slot in the TDMA frame from the mobile terminal 2 to the first codec module 11, so it may be guaranteed that the data frame to be decoded sent by the first RF module 12 to the first codec module 11 is consistent with the B-field data of the corresponding time slot in the TDMA frame sent by the mobile terminal 2. In this embodiment, the data frame can be transmitted under the action of the trigger signal to ensure the completeness and effectiveness of the data frame, thereby increasing the number of broadband voice communication channels.

In a preferred embodiment, the output code rate of the first codec module 11 is less than or equal to 32 kbps, and the sampling frequency of the first codec module 11 is greater than or equal to 16 KHz.

In this embodiment, the first codec module 11 with an output code rate less than or equal to 32 kbps and a sampling frequency greater than or equal to 16 KHz is selected, which can reduce the transmission bandwidth of data frames and increase the number of broadband voice communication channels.

In a preferred embodiment, the length of the encoded data frame that can be stored in the encoding buffer area is set according to the length of the TDMA frame. Wherein, the length of the encoded data frame that can be stored in the encoding buffer area is n×10 ms, and n>0.

In a preferred embodiment, the length of the data frame to be decoded that can be stored in the decoding buffer area is set according to the length of the TDMA frame. Wherein, the length of the data frame to be decoded that can be stored in the decoding buffer area is n×10 ms, n>0.

Since the length of the TDMA frame transmitted between the DECT base station 1 and the mobile terminal 2 is fixed at 10 ms, each of the length of the encoded data frame acquired by the first codec module 11 and the length of the data frame to be decoded from the mobile terminal 2 and 10 ms is in multiples of 0.2, 0.5, 1, 2, 3, etc. That is, in the condition of the length of the encoded data frame is n×10 ms and the length of the data frame to be decoded is also n×10 ms (n>0), in order to ensure that the storage space of the encoding buffer area is sufficient to store the encoded data frame and the storage space of the decoding buffer area is sufficient to store the data frame to be decoded, it is need to set the length of the data that can be stored in the encoding buffer area according to the length of the encoded data frame and TDMA frame, and set the length of the data that can be stored in the decoding buffer area according to the length of the data frame to be decoded and TDMA frame.

For example, if $0<n\leq1$, the length of the encoded data frame that can be stored in the encoding buffer area is set to 20 ms, and the length of the data frame to be decoded in the decoding buffer area is set to 20 ms. For example, when the length of the encoded data frame acquired by the first codec module 11 is 5 ms, the length of the encoded data frame that can be stored in the encoding buffer area is set to 20 ms, so that the first RF module 12 sends the encoded data frame acquired by the first codec module 11 in the encoding buffer area to the mobile terminal 2 in the form of TDMA frame every 5 ms. When the length of the data frame to be decoded from the mobile terminal 2 is 5 ms, the length of the data frame to be decoded can be stored in the decoding buffer area is set to 20 ms, so that the first RF module 12 sends the data frame to be decoded from the mobile terminal 2 to the first codec module 11 in the form of TDMA frames every 5 ms. If n>1, the length of the encoded data frame that can be stored in the encoding buffer area is set to n×20 ms, and the length of the data frame to be decoded in the decoding buffer area is set to n×20 ms. For example, when the length of the encoded data frame acquired by the first codec module 11 is 20 ms, the length of the encoded data frame that can be stored in the encoding buffer area is set to 40 ms and the length of the data frame to be decoded that can be stored in the decoding buffer area is set to 40 ms, so that the first RF module 12 sends the encoded data frame acquired by the first codec module 11 in the encoding buffer area to the mobile terminal 2 in the form of TDMA frame every 20 ms. When the length of the data frame to be decoded from the mobile terminal 2 is 20 ms, the length of the data frame to be decoded can be stored in the decoding buffer area is set to 40 ms, so that the first RF module 12 sends the data frame to be decoded from the mobile terminal 2 to the first codec module 11 in the form of TDMA frames every 20 ms.

In a preferred embodiment, the first trigger signal is one of any time slot in the TDMA frame, internal clock signal, and external clock signal.

It should be noted that the internal clock signal comprises the clock signal output by the internal clock module connected with the first RF module 12, and the external clock signal comprises the clock signal output by the external clock module connected with the DECT base station 1.

For example, the first trigger signal is set by adding a callback function SendPacket, which is configured to send, in the trigger signal processing interface. When the length of the TDMA frame is 10 ms, setting any one of the 24 time slots from the 0th time slot to the 23rd time slot of the TDMA frame, such as the 19th time slot, as the first trigger signal, or setting the 10 ms periodic signal divided by a internal clock module, such as a homologous crystal oscillator, connected with the first RF module 12 as the first trigger signal, or setting a 10 ms pulse signal generated by an external clock module, such as RTC, connected with the DECT base station 1 as the first trigger signal.

In a preferred embodiment, the second trigger signal is one of any time slot in the TDMA frame, internal clock signal and external clock signal.

It should be noted that the internal clock signal comprises the clock signal output by the internal clock module connected with the first RF module 12, and the external clock signal comprises the clock signal output by the external clock module connected with the DECT base station 1.

For example, the second trigger signal is set by adding a callback function RecvPpacket which is configured to receive, in the trigger signal processing interface. When the length of the TDMA frame is 10 ms, setting any one of the 24 time slots from the 0th time slot to the 23rd time slot of the TDMA frame, such as the 4th time slot, as the second trigger signal, or setting the 10 ms periodic signal divided by a internal clock module, such as a homologous crystal oscillator, connected with the first RF module 12 as the second trigger signal, or setting a 10 ms pulse signal generated by an external clock module, such as RTC, connected with the DECT base station 1 as the second trigger signal.

Wherein, when both the first trigger signal and the second trigger signal are any one of the time slots of the TDMA frame, the first trigger signal and the second trigger signal are respectively different time slots in the TDMA frame. It is not mandatory, and the different time slots are just to ensure that the processing time is easier to guarantee.

Figure 4:
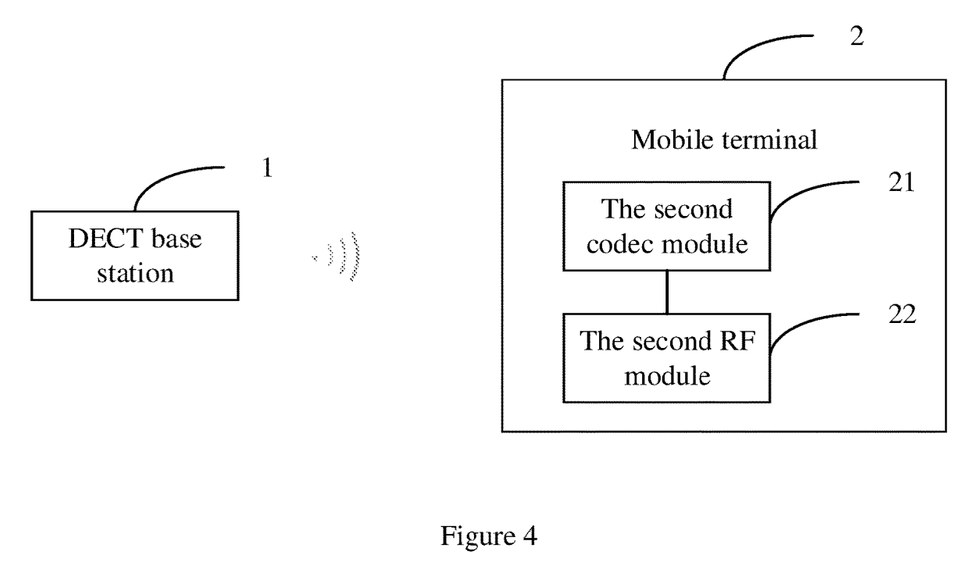
FIG. 4 is a structure diagram of a mobile terminal for transmitting data frame in the second embodiment of the present disclosure.

Please refer to FIG. 4.

As shown in FIG. 4, the second embodiment provides a mobile terminal 2 for transmitting data frame. The mobile terminal 2 comprises a second codec module 21 and a second RF module 22. The second codec module 21 is configured to store the acquired encoded data frame in the encoding buffer area of the second codec module 21. Wherein, between the length of the encoded data frame and the length of a B-field data in the TDMA frame, there is a multiple relationship. The second RF module 22 is configured to send the encoded data frame in the encoding buffer area to the DECT base station 1 when receiving the third trigger signal. Wherein, the second codec module is a terminal codec module, and the name "second" is only to distinguish "first" in the first codec module in the first embodiment, and has nothing to do with the quantity and order. The second RF module is a terminal RF module, and the name "second" is only to distinguish "first" in the first RF module in the first embodiment, and has nothing to do with the number and order.

It should be noted that the third trigger signal is a signal synchronized with the TDMA frame acquired by the second RF module 22. Between the DECT base station 1 and the mobile terminal 2, there is a communication connection. The mobile terminal 2 comprises mobile device such as handle or headset, etc.

For example, according to the DECT Gap protocol, after encoding audio data, the first codec module 11 stores the acquired encoded data frame in the encoding buffer area of the first codec module 11, so that the first RF module 12 can directly extract the encoded data frame acquired by the first codec module 11 from the encoding buffer area when receiving the third trigger signal, and then fill the encoded data frame into the B-field of the corresponding slot in the TDMA frame and send it to the mobile terminal 2. Wherein, in order to avoid data competition for the storage space in the encoding buffer area, double buffering is adopted. For example, when the length of the encoded data frame is exactly equal to the length of a B-field data, the total length of the encoded data frame that can be stored in the encoding buffer area is set to 20 ms. And when the length of the encoded data frame is equal to 0.5 times of the length of a B-field data, the total length of the encoded data frame that can be stored in the encoding buffer area is set to 10 ms.

For example, according to the DECT Gap protocol, after encoding audio data, the second codec module 21 stores the acquired encoded data frame in the encoding buffer area of the second codec module 21, so that the second RF module 22 can directly extract the encoded data frame acquired by the second codec module 21 from the encoding buffer area when receiving the third trigger signal, and then fill the encoded data frame into the B-field of the corresponding slot in the TDMA frame and send it to the DECT base station. Wherein, in order to avoid data competition for the storage space in the encoding buffer area, double buffering is adopted. For example, when the length of the encoded data frame is exactly equal to the length of a B-field data, the total length of the encoded data frame that can be stored in the encoding buffer area is set to 20 ms. And when the length of the encoded data frame is equal to 0.5 times of the length of a B-field data, the total length of the encoded data frame that can be stored in the encoding buffer area is set to 10 ms.

When receiving the third trigger signal, the second RF module 22 extracts the encoded data frame acquired by the second codec module 21 from the encoding buffer area, and fills the extracted encoded data frame into the B-field of the corresponding slot in the TDMA frame and sends it to the DECT base station 1, thereby completing the sending of a complete and ordered data frame to the DECT base station 1. Wherein, each B-field data is a voice data to be sent in a transmission slot in a TDMA frame. The TDMA frame is divided into 24 time slots which are 12 transmission time slots and 12 reception time slots.

In this embodiment, the mobile terminal 2 is installed with the second codec module 21 and the second RF module 22, the second codec module 21 stores the acquired encoded data frame in the encoding buffer area of the second codec module 21, and when receiving the third trigger signal, the second RF module 22 fills the encoded data frame in the encoding buffer area into the B-field of the corresponding slot in the TDMA frame and sends it to the DECT base station 1, thereby completing the sending of a complete and ordered data frame to the DECT base station 1. In this embodiment, by setting the third trigger signal synchronized with the TDMA frame acquired by the second RF module 22, the second RF module 22, under the action of the third trigger signal, can send the encoded data frame acquired by the second codec module 21 in the encoding buffer area to the DECT base station 1, so it is guaranteed that the B-field data of the corresponding time slot in the TDMA frame sent by the second RF module 22 to the DECT base station 1 is consistent with the encoded data frame acquired by the second codec module 21. In this embodiment, the data frame can be transmitted under the action of the trigger signal to ensure the completeness and effectiveness of the data frame, thereby increasing the number of broadband voice communication channels.

In a preferred embodiment, the second RF module 22 is further configured to send, when receiving the fourth trigger signal, the data frame to be decoded from the DECT base station 1 to the second codec module 21. Wherein, between the length of the data frame to be decoded and the length of a B-field data in the TDMA frame, there is a multiple relationship. The second codec module 21 is further configured to store the data frame to be decoded in the decoding buffer area of the second codec module 21 to decode the data frame to be decoded.

It should be noted that the fourth trigger signal is a signal synchronized with the TDMA frame acquired by the second RF module 22.

For example, according to the DECT Gap protocol, when receiving the fourth trigger signal, the second RF module 22 extracts the data fame to be decoded from the TDMA frame sent by the DECT base station 1, sends the extracted data frame to be decoded to the second codec module 21, so that the second codec module 21 can store the data frame to be decoded in the decoding buffer area of the second RF module 22, to decode the data frame to be decoded. Wherein, the data fame to be decoded is the B-field data of the corresponding slot in the TDMA frame. And in order to avoid data competition for the storage space in the decoding buffer area, double buffering is adopted. For example, when the length of the data frame to be decoded is equal to the length of a B-field data, the total length of the data frame to be decoded that can be stored in the decoding buffer area is set to 20 ms. And when the length of the data frame to be decoded is equal to 0.5 times of the length of a B-field data, the total length of the data frame to be decoded that can be stored in the decoding buffer area is set to 10 ms.

After receiving the data frame to be decoded sent by the DECT base station 1, the second codec module 21 stores the data frame to be decoded to the decoding buffer area of the second codec module 21 to decode the data frame to be decoded to acquire audio data, thereby completing the reception of a complete and ordered data frame sent by the DECT base station 1. Wherein, each B-field data is a voice data to be received in a transmission slot in a TDMA frame. The TDMA frame is divided into 24 time slots which are 12 transmission time slots and 12 reception time slots.

In this embodiment, when receiving the fourth trigger signal, the second RF module 22 sends the data frame to be decoded from the DECT base station 1 to the second codec module 21, and the second codec module 21 stores the data frame to be decoded in the decoding buffer area of the second codec module 21 to decode the data frame to be decoded, thereby completing the reception of a complete and ordered data frame sent by the DECT base station 1. Wherein, the data frame to be decoded is the B-field data of the corresponding time slot in the TDMA frame. In this embodiment, by setting the fourth trigger signal synchronized with the TDMA frame acquired by the second RF module 22, the second RF module 22, under the action of the fourth trigger signal, can send the B-field data of the corresponding time slot in the TDMA frame from the DECT base station 1 to the second codec module 21, so it is guaranteed that the data frame to be decoded sent by the second RF module 2 to the second codec module 21 is consistent with the B-field data of the corresponding time slot in the TDMA frame sent by the DECT base station 1. In this embodiment, the data frame can be transmitted under the action of the trigger signal to ensure the completeness and effectiveness of the data frame, thereby increasing the number of broadband voice communication channels.

In a preferred embodiment, the output code rate of the second codec module 21 is less than or equal to 32 kbps, and the sampling frequency of the second codec module 21 is greater than or equal to 16 KHz.

In this embodiment, the second codec module 21 with an output code rate less than or equal to 32 kbps and a sampling frequency greater than or equal to 16 KHz is selected, which can reduce the transmission bandwidth of data frames and increase the number of broadband voice communication channels.

In a preferred embodiment, the length of the encoded data frame that can be stored in the encoding buffer area is set according to the length of the TDMA frame. Wherein, the length of the encoded data frame that can be stored in the encoding buffer area is n×10 ms, and n>0.

In a preferred embodiment, the length of the data frame to be decoded that can be stored in the decoding buffer area is set according to the length of the TDMA frame. Wherein, the length of the data frame to be decoded that can be stored in the decoding buffer area is n×10 ms, n>0.

Since the length of the TDMA frame transmitted between the DECT base station 1 and the mobile terminal 2 is fixed at 10 ms, each of the length of the encoded data frame acquired by the second codec module 21 and the length of the data frame to be decoded from the DECT base station 1 and 10 ms is in multiples of 0.2, 0.5, 1, 2, 3, etc. That is, in the condition of the length of the encoded data frame is n×10 ms and the length of the data frame to be decoded is also n×10 ms (n>0), in order to ensure that the storage space of the encoding buffer area is sufficient to store the encoded data frame and the storage space of the decoding buffer area is sufficient to store the data frame to be decoded, it is need to set the length of the data that can be stored in the encoding buffer area according to the length of the encoded data frame and TDMA frame, and set the length of the data that can be stored in the decoding buffer area according to the length of the data frame to be decoded and TDMA frame.

For example, if $0<n\leq1$, the length of the encoded data frame that can be stored in the encoding buffer area is set to 20 ms, and the length of the data frame to be decoded in the decoding buffer area is set to 20 ms. For example, when the length of the encoded data frame acquired by the second codec module 21 is 5 ms, the length of the encoded data frame that can be stored in the encoding buffer area is set to 20 ms, so that the second RF module 22 sends the encoded data frame acquired by the second codec module 21 in the encoding buffer area to the DECT base station 1 every 5 ms. When the length of the data frame to be decoded from the DECT base station 1 is 5 ms, the length of the data frame to be decoded can be stored in the decoding buffer area is set to 20 ms, so that the second RF module 22 sends the data frame to be decoded from the DECT base station 1 to the second codec module 21 in the form of TDMA frames every 5 ms. If n>1, the length of the encoded data frame that can be stored in the encoding buffer area is set to n×20 ms, and the length of the data frame to be decoded in the decoding buffer area is set to n×20 ms. For example, when the length of the encoded data frame acquired by the second codec module 21 is 20 ms, the length of the encoded data frame that can be stored in the encoding buffer area is set to 40 ms, so that the second RF module 22 sends the encoded data frame acquired by the second codec module 21 in the encoding buffer area to the DECT base station 1 every 20 ms. When the length of the data frame to be decoded from the DECT base station 1 is 20 ms, the length of the data frame to be decoded can be stored in the decoding buffer area is set to 40 ms, so that the second RF module 22 sends the data frame to be decoded from the DECT base station 1 to the second codec module 21 in the form of TDMA frames every 20 ms.

In a preferred embodiment, the third trigger signal is one of any time slot in the TDMA frame, internal clock signal, and external clock signal.

It should be noted that the internal clock signal comprises the clock signal output by the internal clock module connected with the second RF module 22, and the external clock signal comprises the clock signal output by the external clock module connected with the mobile terminal 2.

For example, the third trigger signal is set by adding a callback function SendPacket, which is configured to send, in the trigger signal processing interface. When the length of the TDMA frame is 10 ms, setting any one of the 24 time slots from the 0th time slot to the 23rd time slot of the TDMA frame, such as the 19th time slot, as the third trigger signal, or setting the 10 ms periodic signal divided by a internal clock module, such as a homologous crystal oscillator, connected with the second RF module 22 as the third trigger signal, or setting a 10 ms pulse signal generated by an external clock module, such as RTC, connected with the mobile terminal 2 as the third trigger signal.

In a preferred embodiment, the fourth trigger signal is one of any time slot in the TDMA frame, internal clock signal and external clock signal.

It should be noted that the internal clock signal comprises the clock signal output by the internal clock module connected with the second RF module 22, and the external clock signal comprises the clock signal output by the external clock module connected with the mobile terminal 2.

For example, the fourth trigger signal is set by adding a callback function RecvPacket which is configured to receive, in the trigger signal processing interface. When the length of the TDMA frame is 10 ms, setting any one of the 24 time slots from the 0th time slot to the 23rd time slot of the TDMA frame, such as the 4th time slot, as the fourth trigger signal, or setting the 10 ms periodic signal divided by a internal clock module, such as a homologous crystal oscillator, connected with the second RF module 22 as the fourth trigger signal, or setting a 10 ms pulse signal generated by an external clock module, such as RTC, connected with the mobile terminal 2 as the fourth trigger signal.

Wherein, when both the third trigger signal and the fourth trigger signal are any one of the time slots of the TDMA frame, the third trigger signal and the fourth trigger signal are respectively different time slots in the TDMA frame. It is not mandatory, and the different time slots are just to ensure that the processing time is easier to guarantee.

It should be noted that, in this embodiment, the third trigger signal is terminal first trigger signal, and the name "third" is only to distinguish "first" in the first trigger signal in the first embodiment, and has nothing to do with the quantity and order. The fourth trigger signal is terminal second trigger signal, and the name "fourth" is only to distinguish "second" in the second trigger signal in the first embodiment, and has nothing to do with the number and order.

In addition, in the foregoing embodiments of the present application, the first codec module and the second codec module may be hardware codec installed in integrated chip, or may be processor containing program codes. The processor executes the program codes to realize the corresponding function. The first RF module and the second RF module comprise RF antenna and integrated chip, and the integrated chip has interfaces for receiving and sending signals. The first RF module and the second RF module can use the communication protocols commonly used in the communication field to communicate wirelessly with external devices through RF antennas, such as DECT wireless technology, 2.4G or 5G WIFI technology, or 2.5G, 3G or 4G mobile wireless communication technology.

Figure 5:
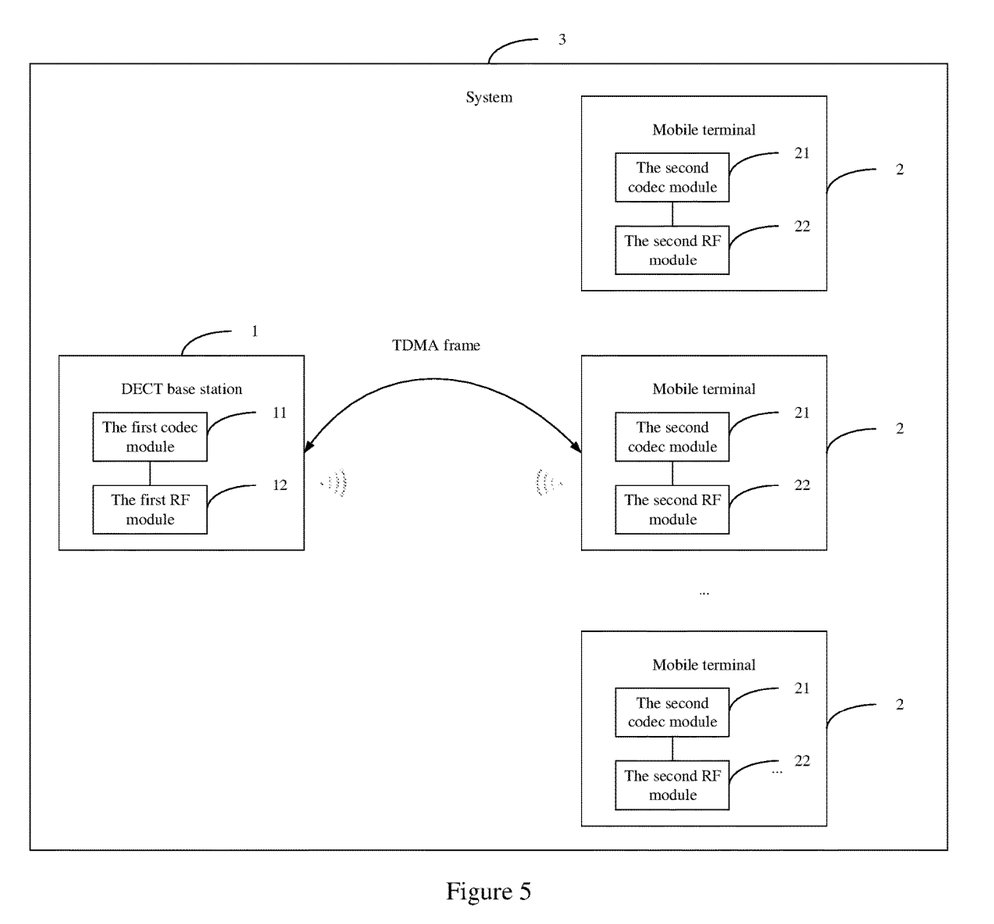
FIG. 5 is a structure diagram of a system for transmitting data frame in the third embodiment of the present disclosure.

Please refer to FIG. 5.

As shown in FIG. 5, the third embodiment provides a system 3 for transmitting the data frame. The system 3 comprises at least one DECT base station 1 described in the first embodiment and multiple mobile terminals 2 described in the second embodiment. The third embodiment can achieve the same beneficial effects as the first embodiment and the second embodiment.

In summary, when the embodiments of the present disclosure are implemented, the following beneficial effects can be achieved.

The DECT base station 1 is installed with the first codec module 11 and the first RF module 12, the first codec module 11 stores the acquired encoded data frame in the encoding buffer area of the first codec module 11, and when receiving the first trigger signal, the first RF module 12 fills the encoded data frame in the encoding buffer area into the B-field of the corresponding slot in the TDMA frame and sends it to the mobile terminal 2, thereby completing the sending of a complete and ordered data frame to the mobile terminal 2. in this embodiment, by setting the first trigger signal synchronized with the TDMA frame acquired by the first RF module 12, the first RF module 12, under the action of the first trigger signal, can send the encoded data frame acquired by the first codec module 11 in the encoding buffer area to the mobile terminal 2, so it is guaranteed that the frame of the encoded data frame sent by the first RF module 12 to the mobile terminal 2 is consistent with the frame of the encoded data frame acquired by the first codec module 11. In the embodiments of the present disclosure, the data frame can be transmitted under the action of the trigger signal to ensure the completeness and effectiveness of the data frame, thereby increasing the number of broadband voice communication channels.

The above-mentioned embodiments are the preferred embodiments of the present disclosure. Variations and modifications are allowed within the scope of the disclosure. Those skilled in the art will appreciate that the features described above can be combined in various ways to form multiple variations of the disclosure. As a result, such variations fall within the scope of the protection to the present disclosure.

The invention claimed is:

1. A DECT base station for transmitting data frame, wherein comprising a first codec module and a first RF module;
   the first codec module is configured to store an acquired encoded data frame in an encoding buffer area of the first codec module; wherein, between a length of the encoded data frame and a length of B-field data in a TDMA frame, there is a multiple relationship; and
   the first RF module is configured to send, when receiving a first trigger signal, the encoded data frame in the encoding buffer area to mobile terminal; wherein the first trigger signal is one of any time slot in the TDMA frame, an internal clock signal, and an external clock signal.

2. The DECT base station for transmitting data frame according to claim 1, wherein the first RF module is further configured to send, when receiving a second trigger signal, a data frame to be decoded from the mobile terminal to the first codec module; wherein, between a length of the data frame to be decoded and the length of the B-field data in the TDMA frame, there is a multiple relationship; and the first codec module is further configured to store the data frame to be decoded in a decoding buffer area of the first codec module to decode the data frame to be decoded.

3. The DECT base station for transmitting data frame according to claim 2, wherein the length of the data frame to be decoded that can be stored in the decoding buffer area is set according to the length of the TDMA frame; wherein, the length of the data frame to be decoded that can be stored in the decoding buffer area is n×10 ms, n>0.

4. The DECT base station for transmitting data frame according to claim 2, wherein the second trigger signal is one of any time slot in the TDMA frame, the internal clock signal, and the external clock signal.

5. The DECT base station for transmitting data frame according to claim 1, wherein an output code rate of the first codec module is less than or equal to 32 kbps, and sampling frequency of the first codec module is greater than or equal to 16 KHz.

6. The DECT base station for transmitting data frame according to claim 1, wherein the length of the encoded data frame that can be stored in the encoding buffer area is set according to the length of the TDMA frame; wherein, the length of the encoded data frame that can be stored in the encoding buffer area is n×10 ms, and n>0.

7. A system for transmitting data frame, wherein comprising at least one DECT base station of claim 1, and multiple mobile terminals;

wherein the mobile terminal comprises a second codec module and a second RF module;

the second codec module is configured to store an acquired encoded data frame in an encoding buffer area of the second codec module; wherein, between a length of the encoded data frame and the length of a B-field data in the TDMA frame, there is a multiple relationship; and the second RF module is configured to send, when receiving a third trigger signal, the encoded data frame in the encoding buffer area to DECT base station; wherein the third trigger signal is one of any time slot in the TDMA frame, the internal clock signal, and the external clock signal.

8. A mobile terminal for transmitting data frame, wherein comprising a second codec module and a second RF module;

the second codec module is configured to store an acquired encoded data frame in an encoding buffer area of the second codec module; wherein, between a length of the encoded data frame and a length of B-field data in a TDMA frame, there is a multiple relationship; and the second RF module is configured to send, when receiving a third trigger signal, the encoded data frame in the encoding buffer area to DECT base station; wherein the third trigger signal is one of any time slot in the TDMA frame, an internal clock signal, and an external clock signal.

9. The mobile terminal for transmitting data frame according to claim 8, wherein the second RF module is further configured to send, when receiving a fourth trigger signal, a data frame to be decoded from the DECT base station to the second codec module; wherein, between a length of the data frame to be decoded and the length of the B-field data in the TDMA frame, there is a multiple relationship; and the second codec module is further configured to store the data frame to be decoded in the decoding buffer area of the second codec module to decode the data frame to be decoded.

10. The mobile terminal for transmitting data frame according to claim 9, wherein the length of the data frame to be decoded that can be stored in the decoding buffer area is set according to the length of the TDMA frame; wherein, the length of the data frame to be decoded that can be stored in the decoding buffer area is n×10 ms, n>0.

11. The mobile terminal for transmitting data frame according to claim 9, wherein the fourth trigger signal is one of any time slot in the TDMA frame, the internal clock signal, and the external clock signal.

12. The mobile terminal for transmitting data frame according to claim 8, wherein an output code rate of the second codec module is less than or equal to 32 kbps, and sampling frequency of the second codec module is greater than or equal to 16 KHz.

13. The mobile terminal for transmitting data frame according to claim 8, wherein the length of the encoded data frame that can be stored in the encoding buffer area is set according to the length of the TDMA frame; wherein, the length of the encoded data frame that can be stored in the encoding buffer area is n×10 ms, and n>0.

* * * * *